Figure 4:
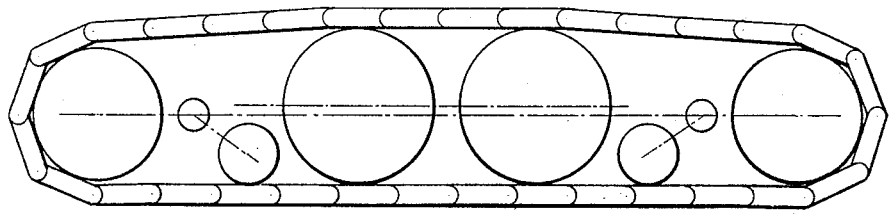

April 25, 1933.  F. A. SMYTHE  1,906,116
TRACTOR
Filed Aug. 1, 1929   3 Sheets-Sheet 1
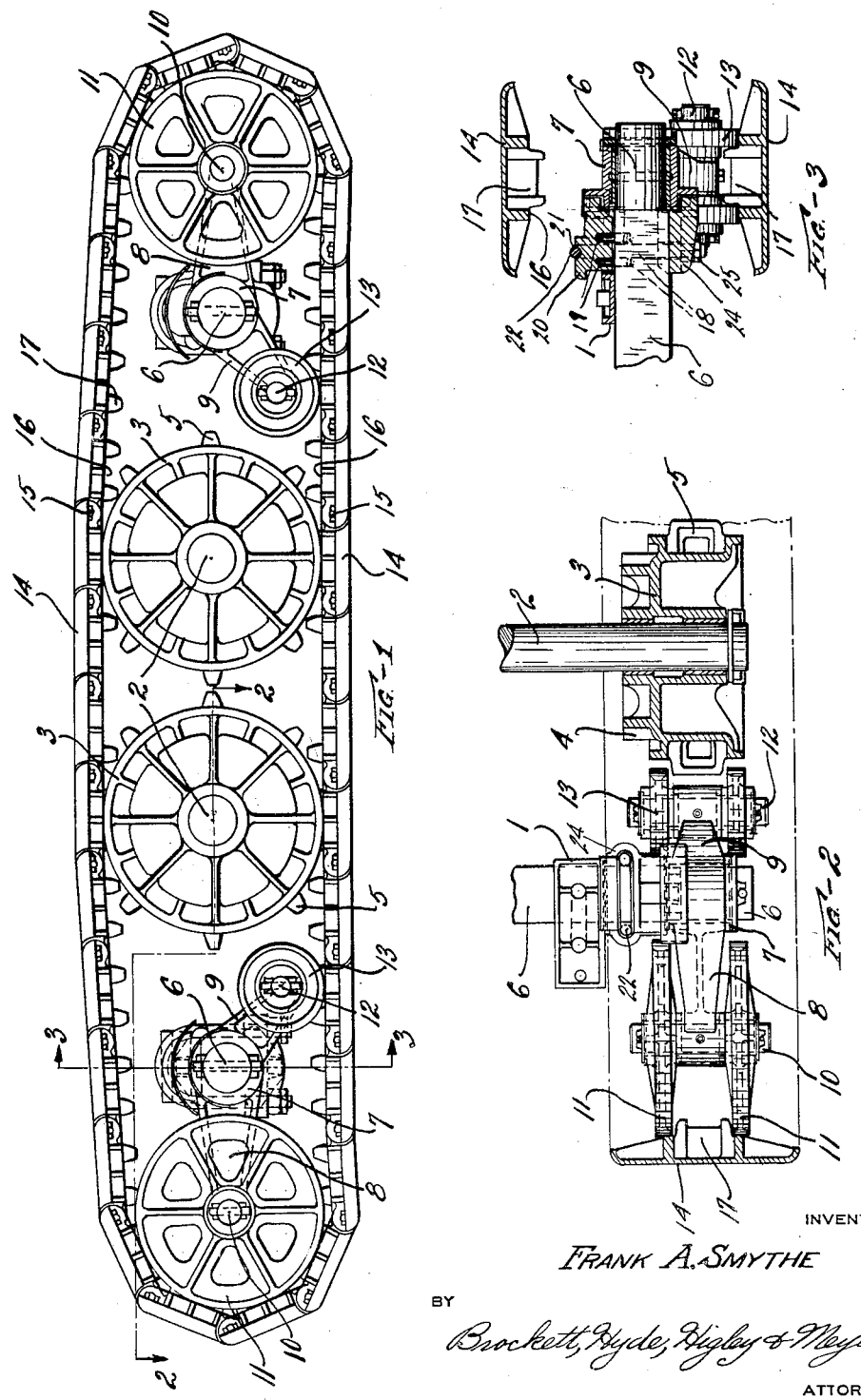
INVENTOR
FRANK A. SMYTHE
BY
Brockett, Hyde, Higley & Meyer
ATTORNEYS April 25, 1933.   F. A. SMYTHE   1,906,116
TRACTOR
Filed Aug. 1, 1929   3 Sheets-Sheet 3

INVENTOR
FRANK A. SMYTHE
BY
Brockett, Hyde, Higley & Meyer
ATTORNEYS

UNITED STATES PATENT OFFICE

FRANK A. SMYTHE, OF LORAIN, OHIO, ASSIGNOR TO THE THEW-SHOVEL COMPANY, OF LORAIN, OHIO, A CORPORATION OF OHIO

TRACTOR

Application filed August 1, 1929. Serial No. 382,682.

This invention relates to tractor trucks and particularly to means for extending or increasing the ground engaging area without materially extending or increasing the fixed base.

The object of the present invention is to provide a tractor of the roller and tread type for use on power shovels, cranes, drag lines, or the like, having a fixed base that is of less area than the base normally required to give the desired longitudinal tipping points to the apparatus without undue strain thereon but is valuable in increasing the lateral stability of the apparatus and provides a relatively small fixed base on which the apparatus as a whole may turn together with a base fixed as to the desired maximum tipping points for the apparatus and embodying self-adjusting means or tread engaging units which by their projection forward and aft of the axles by which the units are supported and that define the limits of the maximum tipping point provide greater ground contact area with lower per unit area pressure on the treads and a self-positioning means that will permit the treads to adapt themselves to ground contours. In tractor trucks used for power shovels and the like there is usually no other support for the entire mechanism but the continuous treads of the tractor traveling around rollers mounted directly upon axles that define the fixed base for the apparatus and for the purpose of protecting the machine against over-loading and undue strains and stresses it is desirable to have a supplementary fixed base upon which the tractor truck may tilt or in some instances, turn and, at the same time, to provide the maximum ground contact area for the treads with the least possible per unit area pressure so that the apparatus may be used with great efficiency upon hard level roads as well as on uneven ground or mire and treads that will adapt themselves to ground contours.

With the foregoing in mind the present invention relates to a tractor truck of the roller and tread type wherein there is provided in connection with each tread a centrally disposed driving and supporting means fixed against vertical movement with respect to the truck frame, and equalizing idler units engaging in the loops of the treads and each including a vertically moving tread loop engaging roller and a trailing tread engaging roller, said rollers being mounted together upon a member articulated about a fixed point or axle on the frame member and adapted for equalization of the load about such point upon said rollers whereby the fixed base of the tractor remains unchanged with an increase in the ground contact area.

It is also a feature of the invention to arrange the rollers of each equalizer unit upon the ends of the two arms of a lever with the point of articulation between the rollers and nearer the trailer roller than the vertically moving tread loop engaging roller to permit the free upward movement of the loop engaging roller on the one hand, and to more properly distribute the load to the two rollers on the other hand.

Still another feature of the invention is the feature providing limit stops for these equalizer tread units whereby the loop engaging rollers are prevented from dropping down too far forward and aft and "digging in" as it is called, and on the other hand are limited in their extreme upward position to prevent undue movement in this direction.

The invention is set forth in one embodiment in the following description, drawings and claims.

Figure 7:
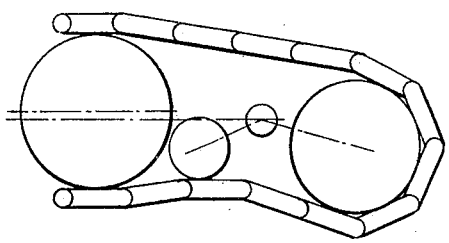
Figure 8:
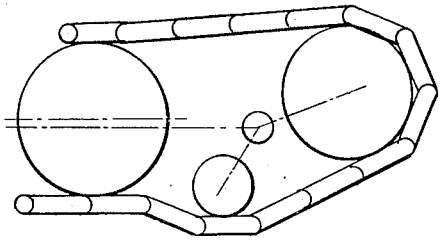
Figure 9:
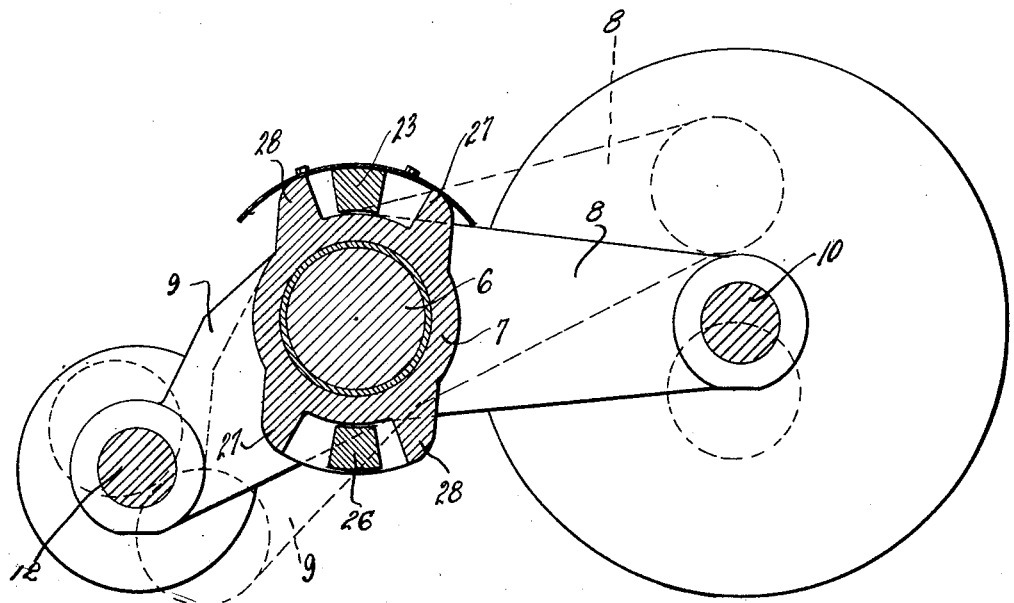
Figures 10, 11:
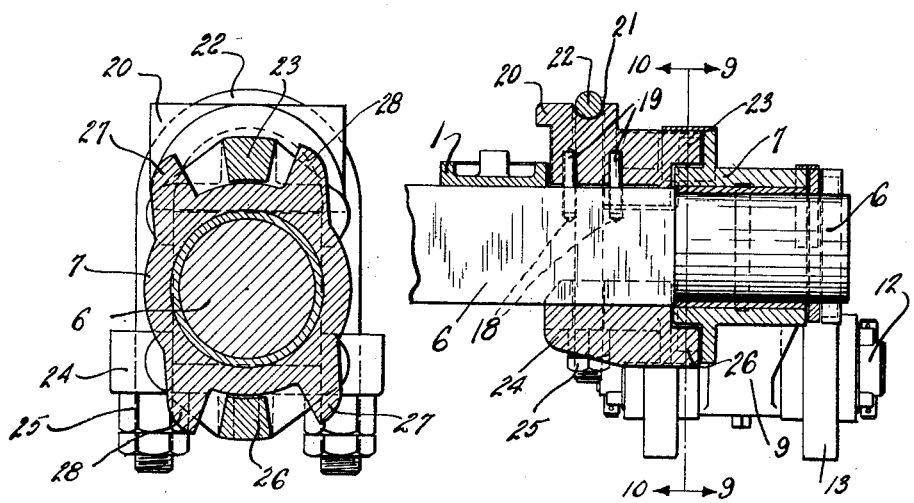

Referring to the drawings, Fig. 1 is a side elevation of the tread and associated roller parts; Fig. 2 is a section upon the line 2—2 of Fig. 1; Fig. 3 is a detail view on the line 3—3 of Fig. 1; Figs. 4, 5, 6, 7, and 8 are diagrammatic views showing the action of the devices under the various operating conditions; Fig. 9 is a detail view taken upon the line indicated by and looking in the direction of the arrows 9—9 in Fig. 11; Fig. 10 is a sectional view taken upon the same line and looking in the direction of the arrows 10—10; and Fig. 11 is a view similar to Fig. 3 but on an enlarged scale and with the links that make up the endless tread removed.

In the embodiment shown in the drawings, 1 represents a suitable frame adapted to carry, in the instance shown, a pair of inner axles 2 spaced apart and each provided outside of the frame on each side with a driving and supporting roller 3. Each of these rollers is provided with a suitable driving gear 4 driven from any suitable source of power. Each of these driving rollers is provided with suitable teeth 5 for engaging the treads as will appear. These two driving rollers have supporting and rolling action on the treads, to be described, and will constitute the main rigid base of the tractor as will more fully appear.

The frame 1 is also provided with two outer axles 6 which ordinarily receive tread end loop idler rollers but, in the present instance, each receives an equalizer tread unit comprising a hub 7 of an equalizing lever having an end loop roller arm 8 and a trailer roller arm 9, the former being provided with an axle 10 for receiving the regular idler rollers 11 which, in this instance has been transferred from the outer axle 6. The trailer arm 9 supports another axle 12 receiving trailing idlers 13. The idlers 11 and 13 are in pairs on the equalizing lever, as shown in Fig. 2, with the lever between the idlers of each pair. The bracket comprising hub 7, arms 8 and 9, with axles 10 and 12, and rollers 11 and 13 constitute the roller unit capable of revolving about axle 6. This mounting for the idlers may be provided at both ends of each tread or at one end only if desired. It is obvious that the weight is transmitted through the axle 6 and is distributed to the idler unit and hence to the loop engaging rollers and trailer rollers. It is preferable to have the arm 8 longer than the arm 9 and in such relation thereto that the former transmits less of the load to its rollers and hence is more sensitive in traveling up and over obstruction. The mounting of these loop engaging rollers in the manner just described, also does away, to some extent, with the tendency toward "digging in" or burrowing into the soft ground.

While the lengthening of the arm 8 prevents burrowing it may be necessary to further limit the downward movement of the arm 8 and to also limit its upward movement. This is provided for by suitable stops illustrated in Figs. 2, 3, 9 and 10 wherein each outer axle 6 is provided with suitable openings 18 for receiving pins 19 engaging in an upper clamping block 20. This block is provided with a suitable groove 21 for receiving a U-shaped clamping bolt 22 which straddles the axle 6. The outer end face of this block is provided with a suitable stop lug 23 shown in Figs. 9 and 10. Below the axle there is a similar block 24 held in place by nuts on the same U-bolt 25. This block also carries a lower stop lug 26 similar to the lug 23 and diametrically opposed to the same with respect to the axle 6. The hub 7 of the equalizer lever is provided with diametrically opposed pairs of lugs 27 and 28. The arrangement of these lugs upon the hub 7 with respect to the position of the two lugs 23 and 26 is such that, when the equalizer unit is in the position shown in Fig. 9, as when the device is on level ground, there is less space between the lugs 28 and lugs 23 and 26 than between the lugs 27 and these same lugs 23 and 26, thereby providing a limited amount of downward movement of the end loop idlers. When the parts are in this same position, indicated in Fig. 9, it is also true that the lugs 27 are so arranged that there is a greater space between them and the lugs 23 and 26 so that greater upward movement is permitted with respect to the end loop idlers than is permitted on the downward movement, such an arrangement being necessary to permit proper equalization with respect to the various ground conditions which the device encounters. It will be noted that such a limited downward movement of these loop engaging idlers is useful in preventing burrowing, as before brought out, and also preventing the front ends of the entire tread units from becoming hooked under banks or the like.

Engaging the driving rollers 3 and the idler units is an endless tread comprising a plurality of links 14 hinged together as at 15, for example, and each provided with a flat portion 16 engaging the plain peripheries of the several drivers and idlers and with teeth 17 cooperating as a rack with the teeth of the driving rollers 3.

Figure 5:
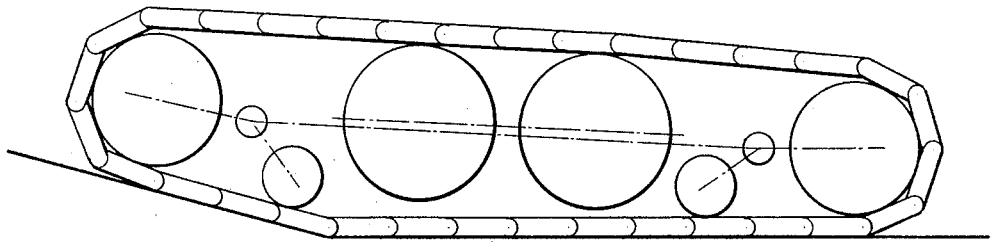
Figure 6:
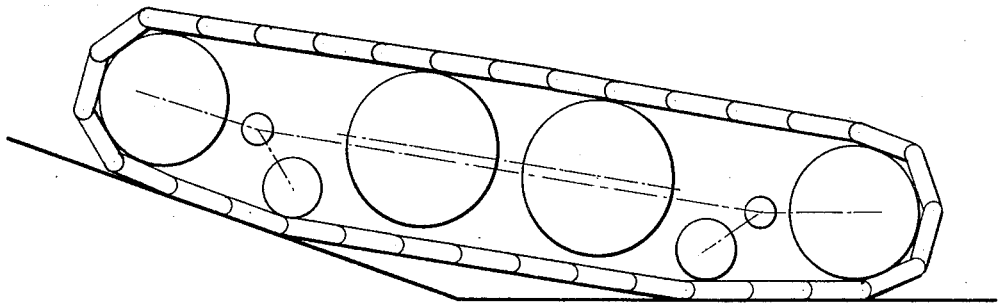

It will be seen from the foregoing that the driving rollers 3 through the treads form what may be termed a rigid base for the tractor and that the roller units arranged in the manner shown, form an additional support engaging the tread forward and aft of the outer axle and constituting a further extension of the base, yielding in character, in a sense, and self-accommodating to the character of the ground upon which the tread is engaging. To illustrate let me refer to Figs. 4 to 8 inclusive. In Fig. 4 the tread is traveling over flat ground and here I find that by reason of the arrangement described the operation of the tractor is extremely steady and does not have the rocking action which is so common in prior devices. Here an extended yieldable ground engaging base is provided. In Fig. 5 the front end extension of the tractor, for example, is ascending an incline while the main portion of the tread is on flat ground. Here the front roller units adjust themselves to the ground conditions and serve to support the load. In Fig. 6 the tractor is continuing up the incline with the yielding of the roller unit at the rear accommodating itself to the ground conditions. In Fig. 7 a projecting knob of ground has inserted itself between the end idlers and the trailer idlers with suitable compensation in the action of the roller unit. In Fig. 8 the extreme rear idlers, for example, are raised upon a knob of ground with a depression made in front into which the trailing idlers sink and do their share of supporting the load.

It will be noted that the bracket arm supporting the end idlers is longer than the arm carrying the trailer idlers. It therefore requires less force to raise the end idlers and provides a tendency for the tractor to emerge from rather than burrow into soft yielding ground.

Having described my invention, I claim:

1. Apparatus of the class described comprising a tractor of the roller and tread type embodying a frame, endless treads, a centrally disposed driving and supporting means for said endless treads on both sides of said frame fixed against vertical movement with respect to said frame and forming a fixed base, said endless treads extending beyond said driving and supporting means at both ends and in end loops, and equalizing idler units engaging in the loops of the treads, each unit including a vertically moving tread loop engaging roller and a tread engaging roller, said rollers being mounted together upon a member articulated about a fixed point or axle on the frame member and adapted for equalization of the load about such point upon said rollers and to provide for variance in the ground contacting area without changing the fixed base of the tractor truck.

2. In tractor mechanism of the class described and comprising a frame and a tread unit for supporting a side thereof, a pair of levers mounted on spaced axle means fixed with said frame, each of said levers having an outwardly extending arm with an end idler roller mounted thereon, and an inwardly extending arm with an equalizing roller mounted thereon, a plurality of driving rollers intermediate said levers and mounted on axle means fixed with said frame, an endless tread mounted on said rollers, with bights about said end idler rollers and stretches therebetween bearing on said driving rollers, said equalizing rollers bearing on the lower of said stretches, and for each of said levers, lug means associated therewith and with said frame respectively for cooperation to limit the lever movement.

3. In tractor mechanism of the class described and comprising a frame and a tread unit for supporting a side thereof, a pair of levers mounted on spaced axle means fixed with said frame, each of said levers having an outwardly extending arm with an end idler roller mounted thereon, and an inwardly extending arm with an equalizing roller mounted thereon, a plurality of driving rollers intermediate said levers and mounted on axle means fixed with said frame, an endless tread mounted on said rollers, with bights about said end idler rollers and stretches therebetween bearing on said driving rollers, said equalizing rollers bearing on the lower of said stretches, and for each of said levers, lug means associated therewith and with said frame respectively for cooperation to limit the lever movement, said lug means being so disposed as to permit the end idler rollers more upward movement than downward movement with respect to their normal operating positions.

In testimony whereof I hereby affix my signature.

FRANK A. SMYTHE.